Patented July 4, 1944

2,352,942

UNITED STATES PATENT OFFICE 2,352,942

REACTION PRODUCT OF ALDEHYDES AND TRIAZINE DERIVATIVES

Gaetano F. D'Alelio and James W. Underwood, Pittsfield, Mass., assignors to General Electric Company, a corporation of New York No Drawing. Application June 19, 1942, Serial No. 447,730

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, etc., and a triazine derivative corresponding to the following general formula:

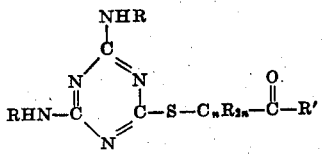

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of aryl radicals and substituted aryl radicals, more particularly halo-aryl radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of aryl and substituted aryl radicals that R' in Formula I may represent are: phenyl, diphenyl, naphthyl, anthracyl, tolyl, xylyl, ethylphenyl, propylphenyl, isopropylphenyl, allylphenyl, 2-butenylphenyl, tertiary-butylphenyl, methylnaphthyl, ethylnaphthyl, iodophenyl, chlorophenyl, bromophenyl, fluorophenyl, chlorotolyl, choroxylyl, dichlorophenyl, bromotolyl, propenylphenyl, etc.

Preferably R in Formula I is hydrogen. However, there also may be used in carrying the present invention into effect compounds such, for instance, as those represented by the general formulas:

II
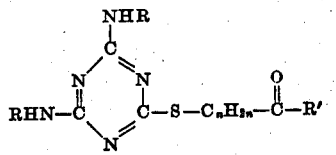

and, more particularly,

III
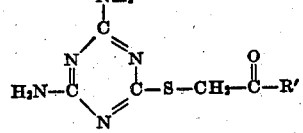

and

IV
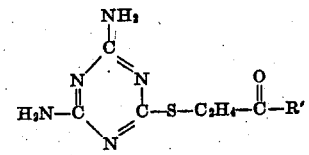

where $n$, R and R' have the same meanings as given above with reference to Formula I.

Instead of the symmetrical triazines (s-triazines) represented by the above formulas, corresponding derivatives of the asymmetrical and vicinal triazines may be used. Also, instead of the mono-thio compounds represented by the above formulas, the di-thio derivatives of the triazines (symmetrical, asymmetrical or vicinal) may be employed.

The triazine derivatives that are used in carrying the present invention into effect are more fully described and are specifically claimed in our copending application Serial No. 447,731, filed concurrently herewith and assigned to the same assignee as the present invention. As pointed out in this copending application, triazine derivatives of the kind employed in practicing the present invention are prepared by effecting reaction between a monomercapto diamino [(—NHR)₂] s-triazine (symmetrical triazine) and a halogenated ketone corresponding to the formula

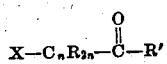

where X represents a halogen atom and $n$, R and R' have the same meanings as given above with reference to Formula I. The reaction preferably is carried out in the presence of a hydrohalide acceptor, e. g., an alkali-metal hydroxide. Specific examples of triazine derivatives embraced by Formula I and that may be used in producing our new condensation products are listed below:

(Diamino s-triazinyl thio methyl) phenyl ketone
(Diamino s-triazinyl thio methyl) para-chloroxenyl ketone
[4,6-di-(methylamino) s-triazinyl thio methyl] phenyl ketone
[4,6-di-(ethylamino) s-triazinyl thio methyl] para-chloroxenyl ketone
[Alpha-(diamino s-triazinyl thio) ethyl] phenyl ketone
[4,6-di-(methylamino) s-triazinyl-2 thio methyl] tolyl ketones
[4,6-di-(ethylamino) s-triazinyl-2 thio methyl] phenyl ketone
[4,6-di-(isobutylamino) s-triazinyl-2 thio methyl] phenyl ketone
[4,6-di-(propenylamino) s-triazinyl-2 thio methyl] phenyl ketone
[4,6-di-(cyclopentylamino) s-triazinyl-2 thio methyl] phenyl ketone
(4,6-dianilino s-triazinyl-2 thio methyl) phenyl ketone
(4,6-ditoluido s-triazinyl-2 thio methyl) phenyl ketone
[4,6-di-(naphthylamino) s-triazinyl-2 thio methyl] phenyl ketone
(Diamino s-triazinyl thio methyl) bromotolyl ketones
(Diamino s-triazinyl thio methyl) xylyl ketones
(Diamino s-triazinyl thio methyl) ethylphenyl ketones
(Diamino s-triazinyl thio methyl) naphthyl ketone
(Diamino s-triazinyl thio methyl) propenylphenyl ketones
(4,6-dianilino s-triazinyl-2 thio methyl) xenyl ketone
[4,6-di-(methylamino) s-triazinyl-2 thio methyl] propylphenyl ketones
(4,6-dianilino s-triazinyl-2 thio methyl) chlorophenyl ketones
[Beta-(diamino s-triazinyl thio) ethyl] phenyl ketone
(Diamino s-triazinyl thio methyl) chlorophenyl ketones
(Diamino s-triazinyl thio methyl) bromophenyl ketones
(Diamino s-triazinyl thio methyl) iodophenyl ketones
(Diamino s-triazinyl thio methyl) fluorophenyl ketones
[4,6-di-(propylamino) s-triazinyl-2 thio ethyl] phenyl ketones
[4,6-di-(fluoroanilino) s-triazinyl-2 thio ethyl] phenyl ketones
[Alpha-(diamino s-triazinyl thio) ethyl] tolyl ketones
[Alpha-(diamino s-triazinyl thio) ethyl] chlorotolyl ketones
[Beta-(diamino s-triazinyl thio) ethyl] tolyl ketones
[Beta-(diamino s-triazinyl thio) ethyl] bromotolyl ketones
[Alpha-(diamino s-triazinyl thio) ethyl] naphthyl ketone
[Beta-(diamino s-triazinyl thio) ethyl] anthracyl ketone
[Alpha-(diamino s-triazinyl thio) ethyl] iodotolyl ketones
(4-methylamino 6-amino s-triazinyl-2 thio methyl) phenyl ketone
(4-anilino 6-methylamino s-triazinyl-2 thio methyl) phenyl ketone
[Alpha-ethyl beta-(diamino s-triazinyl thio) ethyl] phenyl ketone
[Beta-phenyl alpha-(dianilino s-triazinyl thio) ethyl] tolyl ketones
[4,6-di-(bromoethylamino) s-triazinyl-2 thio methyl] phenyl ketone
[4,6-di-(iodoanilino) s-triazinyl-2 thio methyl] tolyl ketones The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and triazine derivatives of the kind embraced by Formula I, numerous examples of which have been given above and in the above-identified copending application.

In the production of molded articles from molding compositions comprising a filled or unfilled thermosetting resin, it is highly desirable that the molding compound have a high plastic flow during molding combined with a rapid cure to an insoluble, infusible state. Surprisingly it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. The cured resins have a high resistance to heat and abrasion, and therefore are especially suitable for use where optimum heat- and abrasion-resistance are properties of primary importance.

As pointed out in our above-identified copending application, the triazine derivatives used in carrying the present invention into effect are not the equivalent of, and are not to be confused with, compounds produced by condensing thioammeline in alkaline solution with a halogenated ketone corresponding to the formula

wherein X represents a halogen atom and R represents a member of the group consisting of hydrogen and lower alkyl radicals, more particularly methyl, ethyl, propyl and butyl radicals. Likewise, the reaction products of an aldehyde with a triazine derivative of the kind used in practicing our invention are not the equivalent of, and are not to be confused with, reaction products of an aldehyde with such a thioammeline-halogenated ketone condensation product, that is, with a ketone having the formula

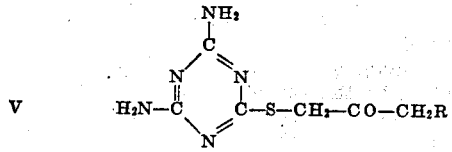

wherein R is a member of the group consisting of hydrogen and lower alkyl radicals.

In carrying our invention into effect the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence of solvents or diluents, fillers, other natural or synthetic resinous bodies, or while admixed with other materials that also can react with the aldehydic reactant or with the triazine derivative, e. g., urea

(NH₂CONH₂)

thiourea, selenourea, iminourea (guanidine), substituted ureas, thioureas, selenoureas and iminoureas, numerous examples of which are given in various copending applications of one or both of us, for instance in D'Alelio copending application Serial No. 363,037, filed October 26, 1940; monoamides of monocarboylic and polycarboylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable triazines other than the triazine derivatives constituting the primary components of the resins of the present invention, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441; mono- hydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative and the aldehyde to form an inter-condensation product by mixing all the reactants and effecting condensation therebetween or by various permutations of reactants as described, for example, in D'Alelio copending application Serial No. 363,037, with particular reference to reactions involving a urea, an aldehyde and a semi-amide of oxalic acid. For instance, we may form a partial condensation product of ingredients comprising (1) urea or melamine or urea and melamine, (2) a triazine derivative of the kind described herein and in our copending application Serial No. 447,731, for example a (diamino s-triazinyl thio methyl) aryl (e. g., phenyl, xenyl, naphthyl, etc.) ketone, a (diamino s-triazinyl thio methyl) halo-aryl (e. g., chlorophenyl, bromoxenyl, iodonaphthyl, fluorotolyl, etc.) ketone, an alpha- or beta-(diamino s-triazinyl thio ethyl) aryl ketone, an alpha- or beta-(diamino s-triazinyl thio ethyl) halo-aryl ketone, etc., and (3) an aldehyde, including polymeric aldehydes, hydroxyaldehydes and aldehyde-addition products, for instance, formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

| | Parts |
|---|---|
| (Diamino s-triazinyl thio methyl) para-chloroxenyl ketone | 67.9 |
| Aqueous formaldehyde (approx. 37.1% HCHO) | 97.2 |
| Sodium hydroxide in 5 parts water | 0.1 | were heated together under reflux at the boiling temperature of the mass for 30 minutes. When a sample of the resulting syrup was heated on a 140° C. hot plate, it bodied to a thermoplastic resin. The resin was potentially heat-curable as evidenced by the fact that when a small amount of chloroacetamide or other curing agent such as mentioned hereafter was incorporated into the syrupy condensation product or into the thermoplastic resin, followed by heating on a 140° C. hot plate, the resin was converted to a cured or insoluble and infusible state.

One (1) part chloroacetamide was added to 115 parts of the syrup produced as above described. The resulting mixture was heated under reflux at boiling temperature for 10 minutes to cause the chloroacetamide to intercondense with the partial condensation product of the triazine derivative and formaldehyde. A molding (moldable) composition was produced from the resinous syrup thereby obtained by mixing therewith 35 parts alpha cellulose in flock form and 0.2 part of a mold lubricant, specifically zinc stearate. The wet molding composition was dried at 75° C. for 2 hours. A well-cured molded piece was produced by molding a sample of the dried and ground molding compound for 5 minutes at 130° C. under a pressure of 2,000 pounds per square inch. The molding compound showed good plastic flow during molding as evidenced by the amount of flash on the molded piece.

Instead of using chloroacetamide (monochloroacetamide) in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to acelerate or to effect the curing of the thermosetting or potentially thermosetting resins of this and other examples are given in various copending applications of one or both of us, for instance in D'Alelio copending applications Serial No. 346,962, filed July 23, 1940, and Serial No. 354,395, filed August 27, 1940, both of which applications are assigned to the same assignee as the present invention. These applications are now U. S. Patents 2,325,375 and 2,325,376, issued July 27, 1943.

Instead of effecting reaction between the aldehyde and the triazine derivative by heating together under reflux as above described, reaction therebetween may be effected by shaking the mixed components at room temperature for a prolonged period, for example for 24 to 72 hours or longer.

Example 2

| | Parts |
|---|---|
| (Diamino s-triazinyl thio methyl) para-chloroxenyl ketone | 34.0 |
| Urea | 54.0 |
| Aqueous formaldehyde (approx. 37.1% HCHO) | 324.0 |
| Sodium hydroxide in 5 parts water | 0.1 | were heated together under reflux at the boiling temperature of the mass for 30 minutes, yielding a syrupy condensation product that bodied to a thermoplastic resin when a sample of it was heated on a 140° C. hot plate. The addition of chloroacetamide and other curing agents such as mentioned under Example 1 to the syrupy material or to the thermoplastic resin, followed by heating on a 140° C. hot plate, caused the resin to convert to an insoluble and infusible state.

One (1) part chloroacetamide was added to 115 parts of the syrup produced as above described, followed by heating under reflux at boiling temperature for 10 minutes. A molding composition was prepared from the resulting syrup in the same manner as described under Example 1 with the exception that a drying time of 2½ hours was employed. A well-cured molded article was obtained by molding a sample of the dried and ground molding compound for 5 minutes at 130° C. under a pressure of 2,000 pounds per square inch. The molding compound showed excellent flow characteristics during molding.

Example 3

| | Parts |
|---|---|
| (Diamino s-triazinyl thio methyl) para-chloroxenyl ketone | 9.0 |
| Phenol (synthetic) | 90.0 |
| Aqueous formaldehyde (approx. 37.1% HCHO) | 195.0 |
| Potassium carbonate in 20 parts water | 2.85 |

A phenol-formaldehyde liquid partial condensation product was prepared by heating together the above-stated amounts of phenol, formaldehyde and potassium carbonate for 3½ hours at 65–70° C. The triazine derivative was now added and the mixture was heated under reflux at boiling temperature for 30 minutes, thereby causing the triazinyl compound to intercondense with the phenol-formaldehyde liquid partial condensation product. The syrupy condensation product obtained in this manner was acidified with 5 parts oxalic acid dissolved in 50 parts water. The acidified syrup was mixed with 114 parts alpha cellulose and 0.1 part zinc stearate to form a molding compound. The wet molding composition was dried at 75° C. for 3 hours. A well-cured molded piece was obtained by molding a sample of the dried and ground molding compound for 5 minutes at 130° C. under a pressure of 2,000 pounds per square inch. The molded article had a good glossy finish and good cohesive characteristics. The molding compound showed good plastic flow during molding.

Example 4

| | Parts |
|---|---|
| (Diamino s-triazinyl thio methyl) para-chloroxenyl ketone | 34.0 |
| Furfural | 57.6 |
| Sodium hydroxide in 5 parts water | 0.1 |
| Water | 100.0 | were heated together under reflux at the boiling temperature of the mass for 30 minutes, yielding a viscous resin. This resin bodied to a thermoplastic mass when a sample of it was dehydrated by heating the viscous material on a 140° C. hot plate. The addition of glycine, sulfamic acid and other curing agents such as mentioned under Example 1 either to the viscous resin or to the dehydrated material, followed by heating on a 140° C. hot plate, caused the resin to convert to an insoluble and infusible or cured state. The resinous material of this example may be used in the production of molding compounds.

*Example 5*

| | Parts |
|---|---|
| (Diamino s-triazinyl thio methyl) para-chloroxenyl ketone | 34.0 |
| Acrolein | 33.6 |
| Sodium hydroxide in 5 parts water | 0.1 |
| Water | 100.0 | were heated together under reflux at the boiling temperature of the mass for 15 minutes, yielding a water-insoluble, viscous resin that cured to an insoluble and infusible state either in the presence or absence of chloroacetamide or other curing agents such as mentioned under Example 1, when a sample of the resin was heated on a 140° C. hot plate. The addition of a curing agent accelerated the curing of the resin to an insoluble and infusible state.

*Example 6*

| | Parts |
|---|---|
| (Diamino s-triazinyl thio methyl) para-chloroxenyl ketone | 34.0 |
| Butyl alcohol | 74.0 |
| Aqueous formaldehyde (approx. 37.1% HCHO) | 81.0 |
| Sodium hydroxide in 10 parts water | 0.2 | were heated together under reflux at the boiling temperature of the mass for 30 minutes, yielding a clear resinous syrup. This syrup was dehydrated by heating it on a steam plate. The dehydrated syrup was soluble in ethyl alcohol and other organic solvents. The addition of curing agents such as mentioned under Example 1 either to the resinous syrup or to the dehydrated resin, followed by heating on a 140° C. hot plate, yielded a resin which cured under heat to an insoluble and infusible state. The cured films were transparent, tough and hard. The solubility and film-forming characteristics of the resinous composition of this example make it especially suitable for use in the preparation of coating and impregnating compositions. For example, it may be used in the production of spirit and baking varnishes. It may be used as a modifier of varnishes of the aminoplast and alkyd-resin types.

*Example 7*

| | Parts |
|---|---|
| (Diamino s-triazinyl thio methyl) para-chloroxenyl ketone | 34.0 |
| Diethyl malonate | 16.0 |
| Aqueous formaldehyde (approx. 37.1% HCHO) | 64.8 |
| Sodium hydroxide in 5 parts water | 0.1 | were heated together under reflux at the boiling temperature of the mass for 30 minutes. When a sample of the resulting resinous syrup was dehydrated by heating on a 140° C. hot plate, a thermoplastic resin was obtained that was insoluble in water or alcohol but soluble in Solvatone. The thermoplastic resin was potentially heat-curable as shown by the fact that when chloracetamide, sulfamic acid, glycine and other curing agents such as mentioned under Example 1 were incorporated either into the syrupy condensation product or into the thermoplastic resin, the resin cured to an insoluble and infusible state when heated on a 140° C. hot plate. The thermoplastic resin advantageously may be used as a modifier of less plastic resins to improve their flow or plasticity characteristics.

*Example 8*

| | Parts |
|---|---|
| (Diamino s-triazinyl thio methyl) para-chloroxenyl ketone | 34.0 |
| Acetamide | 5.9 |
| Aqueous formaldehyde (approx. 37.1% HCHO) | 56.7 |
| Sodium hydroxide in 5 parts water | 0.1 | were heated together under reflux at boiling temperature for 30 minutes. A clear, water-soluble resin was obtained by dehydrating the syrupy condensation product at 100–120° C. This resin bodied to a thermoplastic material upon heating at 140° C. Tough, cured resins were obtained by incorporating phthalic anhydride, chloroacetamide, sulfamic acid, glycine and other curing agents such as mentioned under Example 1 either into the syrupy condensation product, or into the water-soluble dehydrated resin, or into the thermoplastic resin, followed by heating on a 140° C. hot plate. The thermosetting resins may be used in the production of molding compounds or in the preparation of coating and impregnating compositions. The thermoplastic resins may be used advantageously as a modifier of less plastic aminoplasts and other resinous materials of unsatisfactory flow characteristics to improve their plasticity.

*Example 9*

| | Parts |
|---|---|
| (Diamino s-triazinyl thio methyl) para-chloroxenyl ketone | 34.0 |
| Glycerine | 9.2 |
| Aqueous formaldehyde (approx. 37.1% HCHO) | 64.8 |
| Sodium hydroxide in 5 parts water | 0.1 | were heated together under reflux at boiling temperature for 30 minutes, yielding a very viscous resinous syrup. This syrupy resin bodied to a thermoplastic mass when a sample of it was heated on a 140° C. hot plate. This thermoplastic resin was potentially heat-curable as shown by the fact that when glycine, phenacyl chloride, chloroacetaminde, sulfamic acid and other curing agents such as mentioned under Example 1 were incorporated into the viscous resin or into the thermoplastic material, followed by heating on a 140° C. hot plate, the resin cured to an insoluble and infusible state. The thermoplastic resin of this example, like the thermoplastic resin of Example 8, may be used advantageously as a plasticizer of less plastic resins and molding compositions to improve their plasticity or flow characteristics.

*Example 10*

| | Parts |
|---|---|
| (Diamino s-triazinyl thio methyl) para-chloroxenyl ketone | 34.0 |
| Polyvinyl alcohol | 26.4 |
| Aqueous formaldehyde (approx. 37.1% HCHO) | 97.2 |
| Sodium hydroxide in 5 parts water | 0.1 | were heated together under reflux at the boiling temperature of the mass for 30 minutes, yielding a clear viscous syrup that could be used as a varnish composition. Articles were coated with this syrup and the coated article then was baked at 125–150° C. The baked coating was transparent and thermoelastic. The addition of a small amount of hydrochloric acid, phthalic acid, chloroacetamide or other curing agent such as mentioned under Example 1 to the syrupy condensation product, followed by heating on a 140° C. hot plate, yielded a cured product that was tough, hard and water-repellent. The resinous composition of this example may be used in the production of molding compounds and in the preparation of coating and impregnating compositions.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 10, inclusive, at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific ketonic-substituted thio s-triazine named in the above illustrative examples. Thus, instead of (diamino s-triazinyl thio methyl) para-chloroxenyl ketone, we may use, for example, other (diamino s-triazinyl thio methyl) aryl or halo-aryl ketones, for instance (diamino s-triazinyl thio methyl) phenyl ketone, a (diamino s-triazinyl thio methyl) halo-phenyl (e. g., chlorophenyl, iodophenyl, bromophenyl, fluorophenyl) ketone, a (diamino s-triazinyl thio methyl) tolyl ketone, an alpha- or beta-(diamino s-triazinyl thio ethyl) aryl or halo-aryl ketone, or any other compound of the kind embraced, for example, by Formula I, numerous examples of which have been given hereinbefore and in our copending application Serial No. 447,731.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes, (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methyl derivatives of urea, thiourea, selenourea and iminourea, and of substituted ureas, selenoureas, thioureas and iminoureas (numerous examples of which are given in D'Alelio copending application Serial No. 377,524), mono and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methyl melamines). Mixtures of aldehydes and aldehyde-addition products may be employed, e. g., mixtures of formaldehyde and methylol compounds such, for instance, as dimethyl urea, trimethylol melamine, hexa-methylol melamine, etc.

The ratio of the aldehydic reactant to the triazine derivative may be varied over a wide range depending upon the particular properties desired in the finished product. Ordinarily these reactants are employed in an amount corresponding to at least one mol of the aldehyde, specifically formaldehyde, for each mol of the triazine derivative. Thus, we may use, for example, from 1 to 7 or 8 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; other ketonic bodies, e. g., halogenated aliphatic ketones, etc.; nitriles, including halogenated nitriles, e. g., acrylonitrile, methacrylonitrile, succinonitrile, chloroactonitriles, etc.; acylated ureas, more particularly halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, melamine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazine derivative of the kind embraced by Formula I and an aldehyde, specifically formaldehyde, we may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, poloacrylic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be employed as impregnants for electrical coils and for other electrically insulating applications.

What we claim as new and desire to secure by Letters Patent of the United States, is:

1. A composition of matter comprising the reaction product of ingredients comprising an aldehyde and a compound corresponding to the general formula

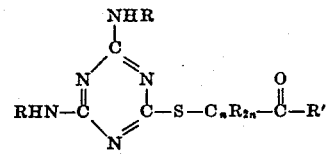

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition as in claim 1 wherein R represents hydrogen.

6. A composition comprising the reaction product of ingredients comprising an aldehyde and a compound corresponding to the general formula

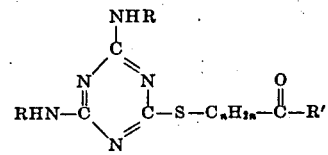

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

7. A composition as in claim 6 wherein R represents hydrogen.

8. A composition as in claim 6 wherein R represents hydrogen and R' represents an aryl radical.

9. A heat-curable resinous composition comprising a heat-convertible condensation product of ingredients comprising formaldehyde and a compound corresponding to the general formula

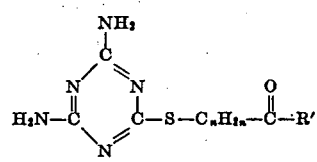

where R' represents a member of the class consisting of aryl and halo-aryl radicals, and $n$ represents an integer and is at least 1 and not more than 2.

10. A product comprising the cured resinous composition of claim 9.

11. A composition comprising the resinous product of reaction of ingredients comprising an aldehyde and a (diamino s-triazinyl thio methyl) aryl ketone.

12. A composition comprising the resinous product of reaction of ingredients comprising formaldehyde and (diamino s-triazinyl thio methyl) phenyl ketone.

13. A composition comprising the resinous product of reaction of ingredients comprising an aldehyde and a (diamino s-triazinyl thio methyl) halo-aryl ketone.

14. A composition comprising the resinous product of reaction of ingredients comprising formaldehyde and (diamino s-triazinyl thio methyl) para-chloroxenyl ketone.

15. A composition comprising the product of reaction of ingredients comprising a urea, an aldehyde and a compound corresponding to the general formula

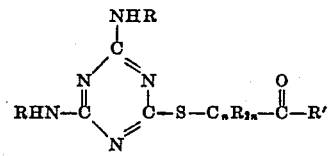

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

16. A composition as in claim 15 wherein the urea component is the compound corresponding to the formula $NH_2CONH_2$ and the aldehyde is formaldehyde.

17. A heat-curable composition comprising the heat-convertible resinous reaction product of (1) a partial condensation product of ingredients comprising formaldehyde and a compound corresponding to the general formula

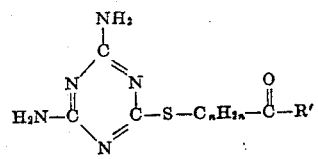

where $n$ represents an integer and is at least 1 and not more than 2, and R' represents a member of the class consisting of aryl and halo-aryl radicals, and (2) a curing reactant.

18. A composition comprising the resinous product of reaction of ingredients comprising melamine, an aldehyde and a compound corresponding to the general formula

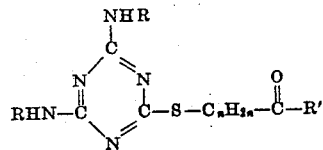

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

19. A resinous composition comprising the product of reaction of ingredients comprising formaldehyde (diamino s-triazinyl thio methyl) para-chloroxenyl ketone and urea.

20. The method of preparing new synthetic compositions which comprises effecting reaction between ingredients comprising an aldehyde and a compound corresponding to the general formula

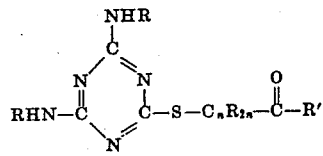

where $n$ represents an integer and is at least 1 and not more than 2, R represents a member of the class consisting of hydrogen and monovalent hydrocarbon and halo-hydrocarbon radicals, and R' represents a member of the class consisting of aryl and halo-aryl radicals.

GAETANO F. D'ALELIO.
JAMES W. UNDERWOOD.

CERTIFICATE OF CORRECTION.

Patent No. 2,352,942. July 4, 1944.

GAETANO F. D'ALELIO, ET AL.

It is hereby certified that error appears in the printed specification of the above numbered patent requiring correction as follows: Page 1, first column, line 50, for "flluorophenyl" read --fluorophenyl--; page 3, first column, line 54, for "monocarboylic" read --monocarboxylic--; same line, for "polycarboylic" read --polycarboxylic--; page 4, first column, line 60, for "acelerate" read --accelerate--; page 5, second column, line 57, for "chloroacetaminde" read --chloroacetamide--; page 6, first column, line 76, for "poly-methyl" read --poly-methylol--; and second column, line 5, for "mono and" read --mono- and--; line 15, for "hexa-methyl" read --hexa-methylol--; line 19, for "dimethyl" read --dimethylol--; line 61-62, for "chloroactonitriles" read --chloroacetonitriles--; line 72, before "melamine-aldehyde" insert the words and comma "aminotriazole-aldehyde condensation products,--; page 7, first column, line 20, for "poloacrylic" read --polyacrylic--; page 8, first column, line 32, for that portion of the formula reading "-S-$C_nH_{2n}$" read -- -S-$C_nR_{2n}$ --; and second column, line 9, after "formaldehyde" insert a comma; and that the said Letters Patent should be read with this correction therein that the same may conform to the record of the case in the Patent Office.

Signed and sealed this 29th day of August, A. D. 1944.

(Seal)

Leslie Frazer
Acting Commissioner of Patents.